(12) United States Patent
Wang

(10) Patent No.: US 12,493,725 B1
(45) Date of Patent: Dec. 9, 2025

(54) LOCK FOR DATA INTERFACE

(71) Applicant: Haining Wang, Shenzhen (CN)

(72) Inventor: Haining Wang, Shenzhen (CN)

( * ) Notice: Subject to any disclaimer, the term of this patent is extended or adjusted under 35 U.S.C. 154(b) by 49 days.

(21) Appl. No.: 18/742,893

(22) Filed: Jun. 13, 2024

(30) Foreign Application Priority Data

Jun. 7, 2024 (CN) .......................... 202421307157.4

(51) Int. Cl.
*G06F 21/88* (2013.01)

(52) U.S. Cl.
CPC .................................... *G06F 21/88* (2013.01)

(58) Field of Classification Search
CPC ........ G06F 21/88; G06F 1/1679; E05B 15/00; E05B 17/00; E05B 63/00
USPC ............................................................ 70/57
See application file for complete search history.

(56) References Cited

U.S. PATENT DOCUMENTS

| | | | | |
|---|---|---|---|---|
| 4,907,111 A * | 3/1990 | Derman | ................ | G11B 19/00 360/99.18 |
| 4,918,952 A * | 4/1990 | Lakoski | ................ | E05B 73/00 70/57 |
| 5,220,815 A * | 6/1993 | Davidge | ............ | H01R 13/447 70/168 |
| 5,327,752 A * | 7/1994 | Myers | ................ | E05B 73/0005 70/57 |
| 5,791,171 A * | 8/1998 | Kelley | ................ | E05B 67/36 70/57 |
| 6,000,251 A * | 12/1999 | Murray, Jr. | ......... | E05B 73/0082 70/57 |
| 8,935,943 B2 * | 1/2015 | Derman | ............. | E05B 73/0005 70/57 |
| 2004/0120112 A1* | 6/2004 | Mullen | ............... | E05B 73/0082 248/552 |
| 2008/0034816 A1* | 2/2008 | Lu | ....................... | E05B 73/0082 70/58 |
| 2010/0320884 A1* | 12/2010 | Shiroishi | ................ | G06F 21/88 312/223.1 |
| 2013/0265709 A1* | 10/2013 | Huang | ................... | G06F 21/88 361/679.32 |
| 2014/0118930 A1* | 5/2014 | Sedon | ..................... | G06F 21/88 361/679.56 |
| 2015/0167353 A1* | 6/2015 | Winkler | ............... | E05B 63/006 70/344 |
| 2021/0047866 A1* | 2/2021 | Chen | .................. | E05B 17/2019 |
| 2021/0049311 A1* | 2/2021 | Saito | ................... | E05B 73/0005 |
| 2021/0054665 A1* | 2/2021 | Allen | ..................... | G06F 21/88 |
| 2022/0207195 A1* | 6/2022 | Chang | ................... | G06F 1/1632 |
| 2022/0222388 A1* | 7/2022 | Teeter | ................... | G02B 6/4246 |
| 2022/0230491 A1* | 7/2022 | Ufkes | ................ | G07C 9/00309 |
| 2023/0383572 A1* | 11/2023 | Xiang | ................ | E05B 27/0003 |

* cited by examiner

*Primary Examiner* — Nathan Cumar

(57) ABSTRACT

A lock for a data interface includes a lock case main body, a locking arm, an elastic reset device and a locking device. The lock case main body is provided with a first opening, and the first opening is configured to sleeve a data interface. The locking arm is rotatably connected to the lock case main body. The locking arm is able to be moved between a locked position and an unlocked position by rotation. The elastic reset device is connected to the locking arm to push and reset the locking arm to the locked position, so that the locking arm clamps the data interface together with a side wall of the first opening. The locking device is connected to the lock case main body. The locking device is configured to lock the locking arm.

20 Claims, 8 Drawing Sheets

LOCK FOR DATA INTERFACE

CROSS-REFERENCE TO RELATED APPLICATIONS

The application claims priority of Chinese patent application CN2024213071574, filed on Jun. 7, 2024, which is incorporated herein by reference in its entireties.

TECHNICAL FIELD

The present disclosure relates to the field of data interfaces, and in particular, to a lock for a data interface.

BACKGROUND

A data interface can facilitate a user to read data stored in a device, but there are no protective measures for the existing data interfaces on the market. Anyone can read data in devices through the data interfaces, which has extremely poor security. Therefore, data is easily leaked, and some criminals would tamper the data in the devices through the data interfaces. Therefore, there is an urgent need to provide a lock for a data interface on the market to improve the security of the data interface.

SUMMARY

In order to overcome the shortcomings of the prior art, the present disclosure provides a lock for a data interface.

The lock for a data interface includes:
- a lock case main body, wherein the lock case main body is provided with a first opening, and the first opening is configured to sleeve a data interface;
- a locking arm, wherein the locking arm is rotatably connected to the lock case main body;
- the locking arm is able to be moved between a locked position and an unlocked position by rotation;
- an elastic reset device, wherein the elastic reset device is connected to the locking arm to push and reset the locking arm to the locked position, so that the locking arm clamps the data interface together with a side wall of the first opening;
- a locking device, wherein the locking device is connected to the lock case main body; the locking device is configured to lock the locking arm; when the locking device is in an unlocked state, the locking arm is able to be moved between the locked position and the unlocked position by rotation; and when the locking device is in a locked state, the locking arm is unable to be rotated, and the locking device locks the locking arm in the locked position.

As an improvement of the present disclosure, the lock case main body is further provided with a second opening; the locking device includes a mounting housing, a lock cylinder, and a baffle plate; the mounting housing is mounted at the second opening; the lock cylinder is arranged in the mounting housing, and the lock cylinder is able to rotate in the mounting housing; the baffle plate sleeves the lock cylinder; the baffle plate is able to rotate with the lock cylinder, so that the baffle plate is able to move between a first position and a second position by rotation; when the baffle plate moves to the first position, the baffle plate blocks and locks the locking arm in the locked position; and when the baffle plate moves to the second position, the baffle plate relieves the blockage on the locking arm, so that the locking arm is able to be rotated to the unlocked position to relieve the clamping of the locking arm on the data interface.

As an improvement of the present disclosure, several first locking members are arranged in the mounting housing; the first locking members are configured to lock the lock cylinder to the mounting housing; when the first locking members are in an unlocked state, the lock cylinder is able to rotate in the mounting housing; the baffle plate is able to rotate with the lock cylinder, so that the baffle plate is able to move between the first position and the second position by rotation; and when the first locking members are in a locked state, the lock cylinder is unable to rotate in the mounting housing, so as to fix the baffle plate in the second position, so that the baffle plate blocks and locks the locking arm in the locked position.

As an improvement of the present disclosure, the lock cylinder is provided with a key hole; each first locking member includes a first locking pin, a second locking pin, and a first spring; a first locking hole is provided in the mounting housing; a second locking hole is provided in the lock cylinder; the first spring is arranged in the first locking hole; one end of the first locking pin is connected to the first spring; the second locking pin is inserted into the second locking hole; the other end of the first locking pin is abutted with the second locking pin; a first joint is formed between the first locking pin and the second locking pin; a second joint is formed at a connection between the lock cylinder and the mounting housing; when the first joint is aligned with the second joint, the first locking member is in the unlocked state; two ends of the first locking pin are located in the first locking hole; two ends of the second locking pin are located in the second locking hole; the lock cylinder is able to rotate in the mounting housing, and the baffle plate is able to rotate with the lock cylinder, so that the baffle plate is able to rotate between the first position and the second position; when the first joint is misaligned with the second joint, the first locking member is in the locked state; one end of the first locking pin is inserted into the second locking hole, and the other end of the first locking pin is inserted into the first locking hole, so that the lock cylinder is unable to rotate in the mounting housing; or, when the first joint is misaligned with the second joint, the first locking member is in the locked state;

and one end of the second locking pin is inserted into the second locking hole, and the other end of the second locking pin is inserted into the first locking hole, so that the lock cylinder is unable to rotate in the mounting housing.

As an improvement of the present disclosure, lengths of the first locking pins of the several first locking members are the same, and lengths of the second locking pins of the several first locking members are different from one another.

As an improvement of the present disclosure, the locking arm is provided with a first end, a second end, a rotating shaft, and a connecting end located between the first end and the second end, and the connecting end is rotatably connected to the lock case main body through the rotating shaft.

As an improvement of the present disclosure, when the baffle plate moves to the first position, the baffle plate pushes and blocks the first end in a direction facing away from the side wall of the first opening to push and block the second end in a direction close to the side wall of the first opening; the second end of the locking arm is blocked and locked in the locked position; the second end of the locking arm clamps the data interface together with the side wall of the first opening; when the baffle plate moves to the second position, the baffle plate relieves the blockage on the locking arm, so that the first end is able to rotate in the direction close to the side wall of the first opening; and the second end is able to rotate to the unlocked position in the direction facing away from the side wall of the first opening, so that the second end is separated from the data interface to relieve the clamping of the second end of the locking arm on the data interface.

As an improvement of the present disclosure, the lock case main body is further provided with an avoidance slot; when the baffle plate moves to the first position, the baffle plate is located in the avoidance slot; the baffle plate pushes and blocks the first end in the direction facing away from the side wall of the first opening to push the second end in the direction close to the side wall of the first opening; the first end is unable to rotate into the avoidance slot; when the baffle plate moves to the second position, the baffle plate moves out of the avoidance slot; the baffle plate relieves the blockage on the locking arm, so that the first end is able to rotate into the avoidance slot in the direction close to the side wall of the first opening; and the second end is able to rotate to the unlocked position in the direction facing away from the side wall of the first opening, so that the second end is separated from the data interface and relieves the clamping of the second end of the locking arm on the data interface.

As an improvement of the present disclosure, the elastic reset device is connected to the rotating shaft.

As an improvement of the present disclosure, the elastic reset device is a torsion spring; the torsion spring is provided with a first sleeving opening; the torsion spring sleeves the rotating shaft through the first sleeving opening; the first opening is further provided with a limiting column on the side wall; the torsion spring is provided with a first clastic arm and a second clastic arm; the second clastic arm is located between the second end and the limiting column; the first clastic arm pushes the first end in the direction facing away from the side wall of the first opening to push the second end in the direction close to the side wall of the first opening; and the second end clamps the data interface together with the side wall of the first opening.

As an improvement of the present disclosure, the second end of the locking arm is provided with a first hook portion; and when the locking arm is rotated to the locked position, the first hook portion is connected to a first hook fitting portion of the data interface.

As an improvement of the present disclosure, a second positioning groove is provided at the first end of the locking arm; when the baffle plate moves to the first position, the baffle plate resists against an inner wall of the second positioning groove; the baffle plate pushes and blocks the first end in a direction facing away from the side wall of the first opening to push and block the second end in a direction close to the side wall of the first opening; the second end of the locking arm is blocked and locked in the locked position; and the second end of the locking arm clamps the data interface together with the side wall of the first opening.

As an improvement of the present disclosure, the data interface is an On-Board Diagnostic data interface.

As an improvement of the present disclosure, a second sleeving opening is provided on the baffle plate, and the baffle plate sleeves the lock cylinder through the second sleeving opening.

As an improvement of the present disclosure, the second opening is provided with a first positioning protrusion on an inner wall; a first positioning groove is provided on an outer side wall of the mounting housing; the first positioning groove is connected to the first positioning protrusion; or, the second opening is provided with a first positioning groove on an inner wall; a first positioning protrusion is arranged on an outer side wall of the mounting housing; and the first positioning groove is connected to the first positioning protrusion.

As an improvement of the present disclosure, the mounting housing includes a first mounting portion and a second mounting portion; the first mounting portion is provided with a first flange; the second mounting portion is provided with a second flange; the second mounting portion detachably sleeves the first mounting portion to form the first positioning groove between the first flange and the second flange; and the second flange compresses the first positioning protrusion onto the first flange.

As an improvement of the present disclosure, the second mounting portion is in threaded connection to the first mounting portion.

As an improvement of the present disclosure, the lock case main body includes an upper case and a lower case; and the upper case is detachably connected to the lower case.

As an improvement of the present disclosure, the upper case is connected to the lower case through a buckle.

The present disclosure further provides a lock for an OBD data interface, including:
　　a lock case main body, wherein the lock case main body is provided with a first opening, and the first opening is configured to sleeving a data interface;
　　a locking arm, wherein the locking arm is rotatably connected to the lock case main body;
　　the locking arm is able to be moved between a locked position and an unlocked position by rotation;
　　an elastic reset device, wherein the elastic reset device is connected to the locking arm to push and reset the locking arm to the locked position, so that the locking arm clamps the data interface together with a side wall of the first opening;
　　a locking device, wherein the locking device is connected to the lock case main body;
　　the locking device is configured to lock the locking arm; when the locking device is in an unlocked state, the locking arm is able to be moved between the locked position and the unlocked position by rotation; and when the locking device is in a locked state, the locking arm is unable to be rotated, and the locking device locks the locking arm in the locked position.

The present disclosure has the beneficial effects: the present disclosure provides a lock for a data interface.

The lock includes a lock case main body, wherein the lock case main body is provided with a first opening, and the first opening is configured to sleeve a data interface; a locking arm, wherein the locking arm is rotatably connected to the lock case main body; the locking arm can be moved between a locked position and an unlocked position by rotation; an elastic reset device, wherein the elastic reset device is connected to the locking arm to push and reset the locking arm to the locked position, so that the locking arm clamps the data interface together with a side wall of the first opening; a locking device, wherein the locking device is connected to the lock case main body; the locking device is configured to lock the locking arm; when the locking device is in an unlocked state, the locking arm can be moved between the locked position and the unlocked position by rotation; and when the locking device is in a locked state, the locking arm cannot be rotated, and the locking device locks the locking arm in the locked position. A user can use the locking device to lock the locking arm, and lock the locking arm in the locked position, so that the locking arm and the side wall of the first opening clamp the data interface, and the lock case main body closes the data interface, thereby preventing criminals from stealing data through the data interface. When a user needs to read data, the user can relieve the locking of the locking device on the locking arm, so that the locking device is in the unlocked state, and the locking arm can be rotated to the unlocked position. Thus, the locking arm can be separated from the data interface by rotation, so as to relieve the clamping of the locking arm and the side wall of the first opening on the data interface, which removes the lock case main body from the data interface, and the user can read the data using the data interface.

BRIEF DESCRIPTION OF THE DRAWINGS

To describe the technical solutions in the embodiments of the present disclosure more clearly, the following briefly introduces the accompanying drawings for describing the embodiments. The accompanying drawings in the following description show merely some embodiments of the present utility model, and a person of ordinary skill in the art may still derive other drawings from the accompanying drawings without creative efforts.

The present disclosure is further described below in detail in combination with the accompanying drawings and embodiments.

DETAILED DESCRIPTION OF THE EMBODIMENTS

Figure 1:
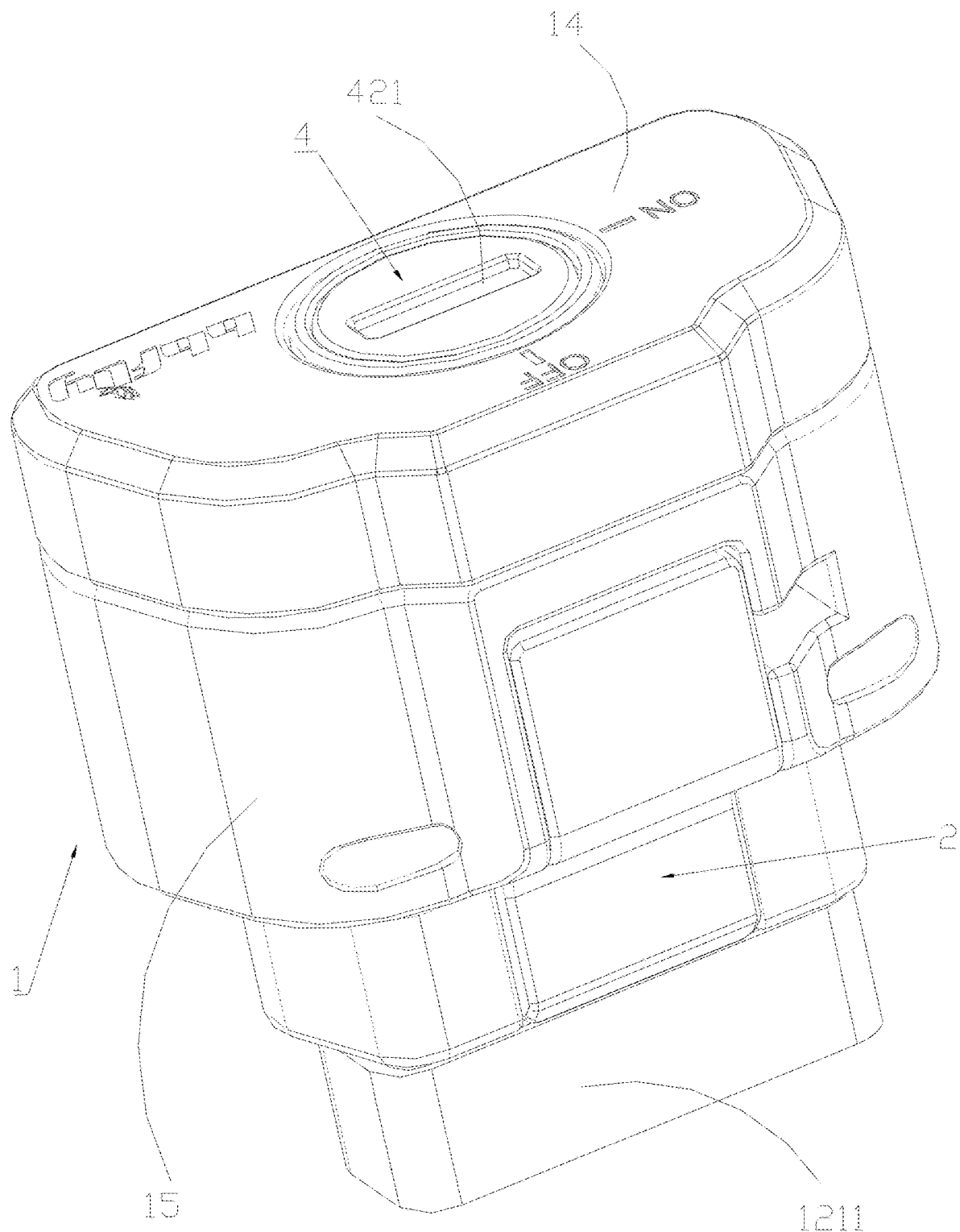
FIG. 1 is a schematic diagram of an entire structure of the present disclosure.
Figure 2:
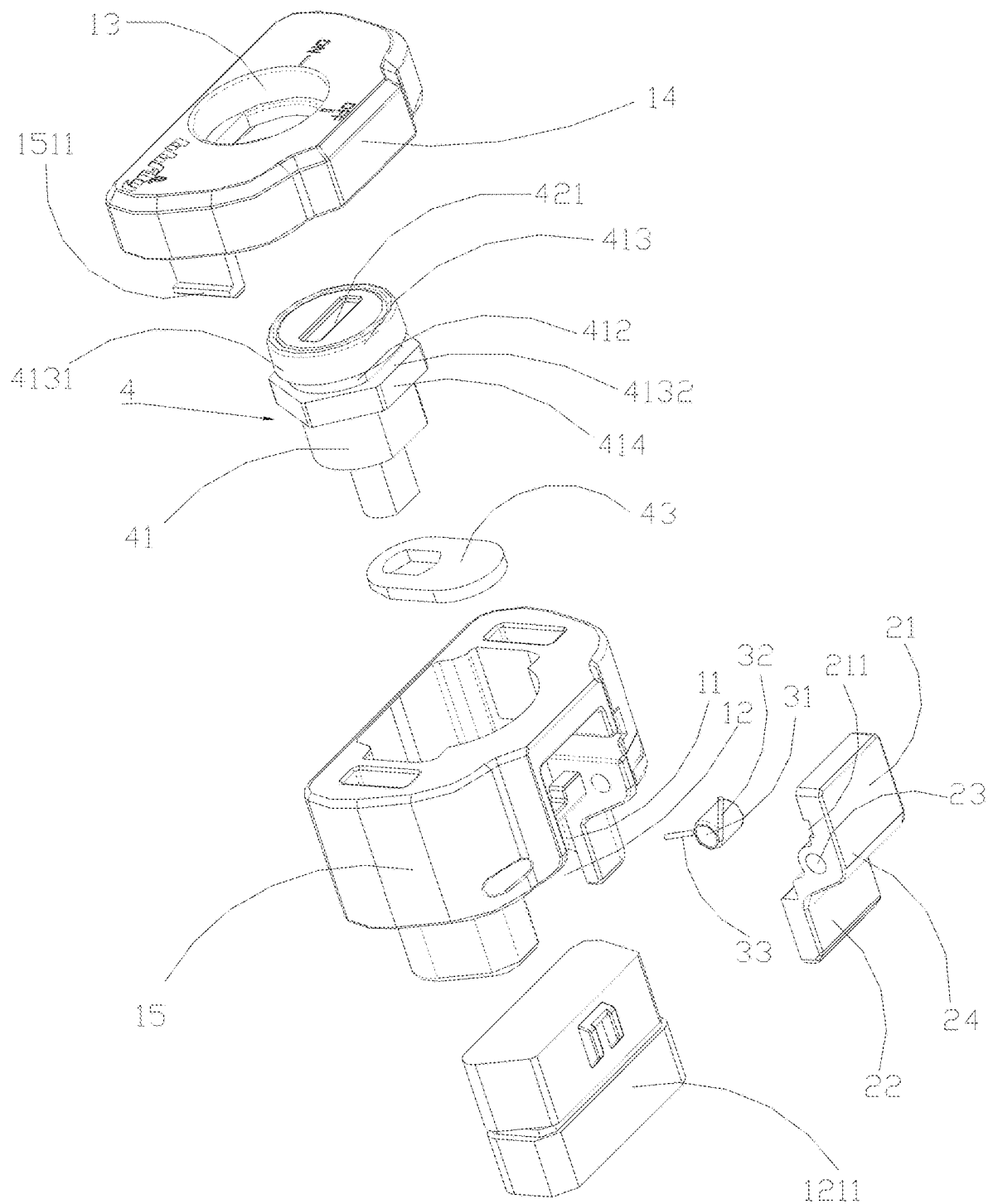
FIG. 2 is an exploded view of the present disclosure.
Figure 3:
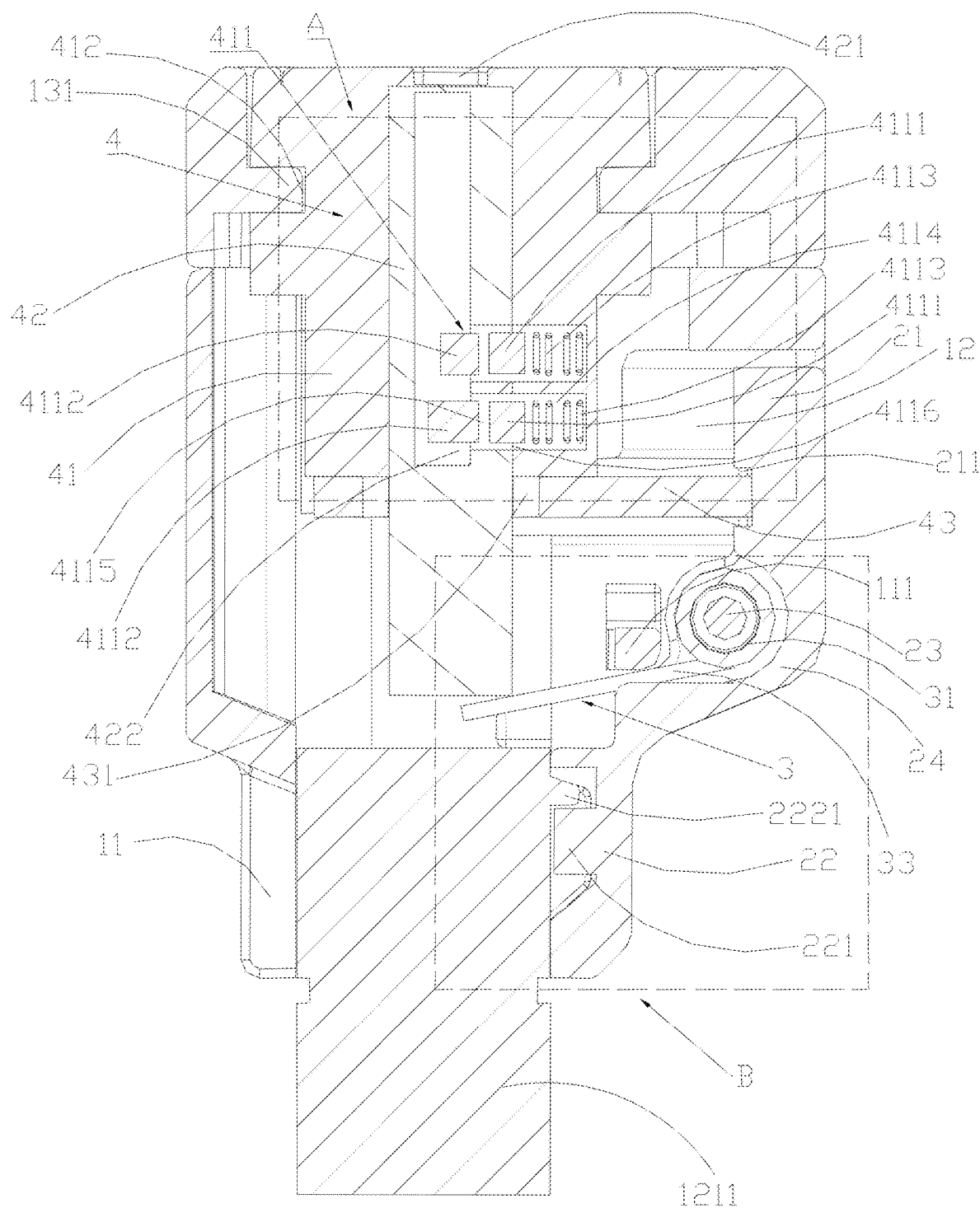
FIG. 3 is a sectional view cut away along a lock cylinder, showing: When the first joint and the second joint are misaligned, the first locking member is in the locked state; one end of the first locking pin is inserted into the second locking hole, and the other end of the first locking pin is inserted into the first locking hole; the lock cylinder cannot rotate in the mounting housing, and the baffle plate is located in the first position to push and block the first end in the direction facing away from the side wall of the first opening, so as to push and block the second end in the direction close to the side wall of the first opening; the second end of the locking arm is stopped and blocked at the locked position to clamp the data interface.
Figure 4:
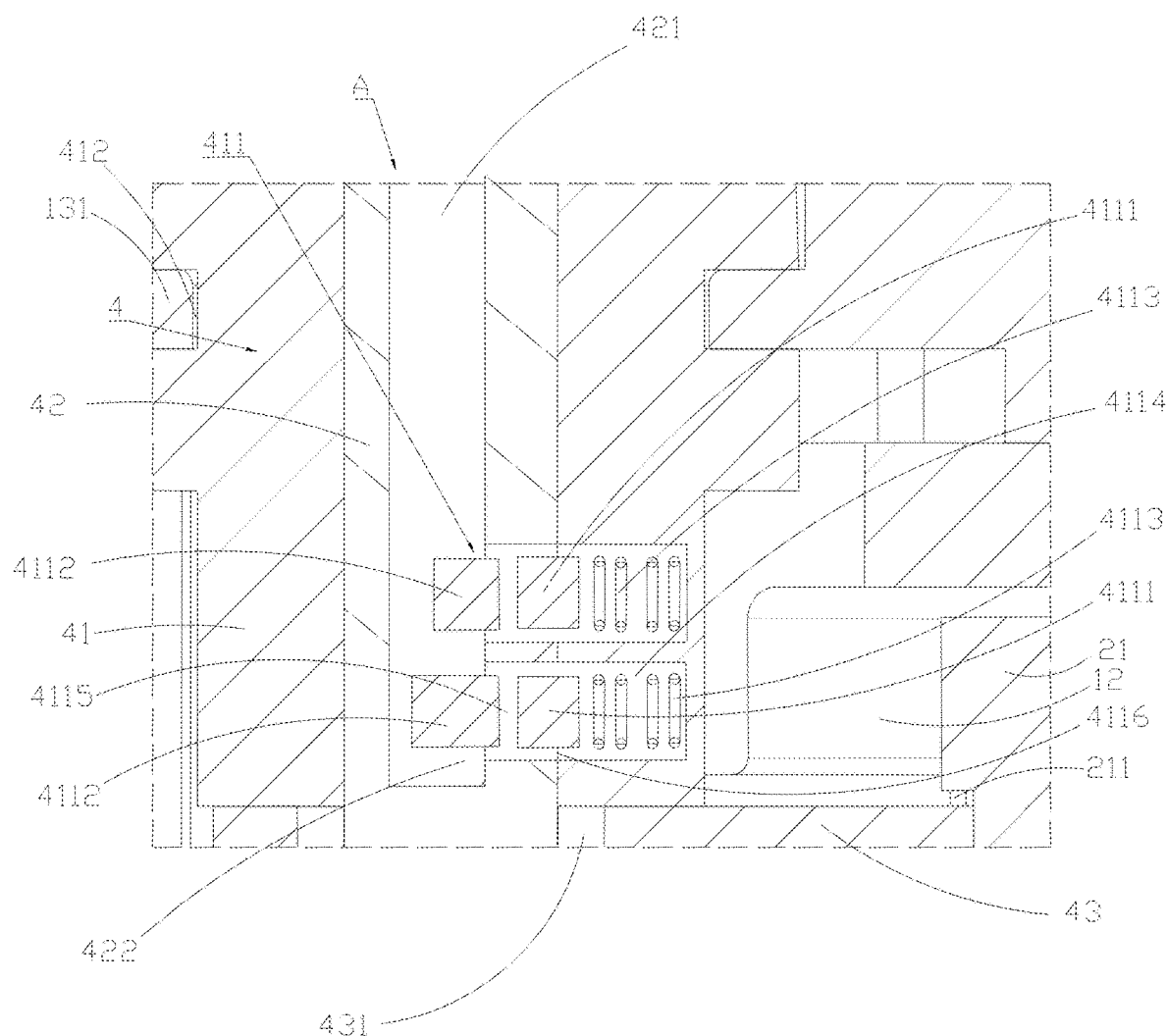
FIG. 4 is an enlarged view of the part A in FIG. 3.
Figure 5:
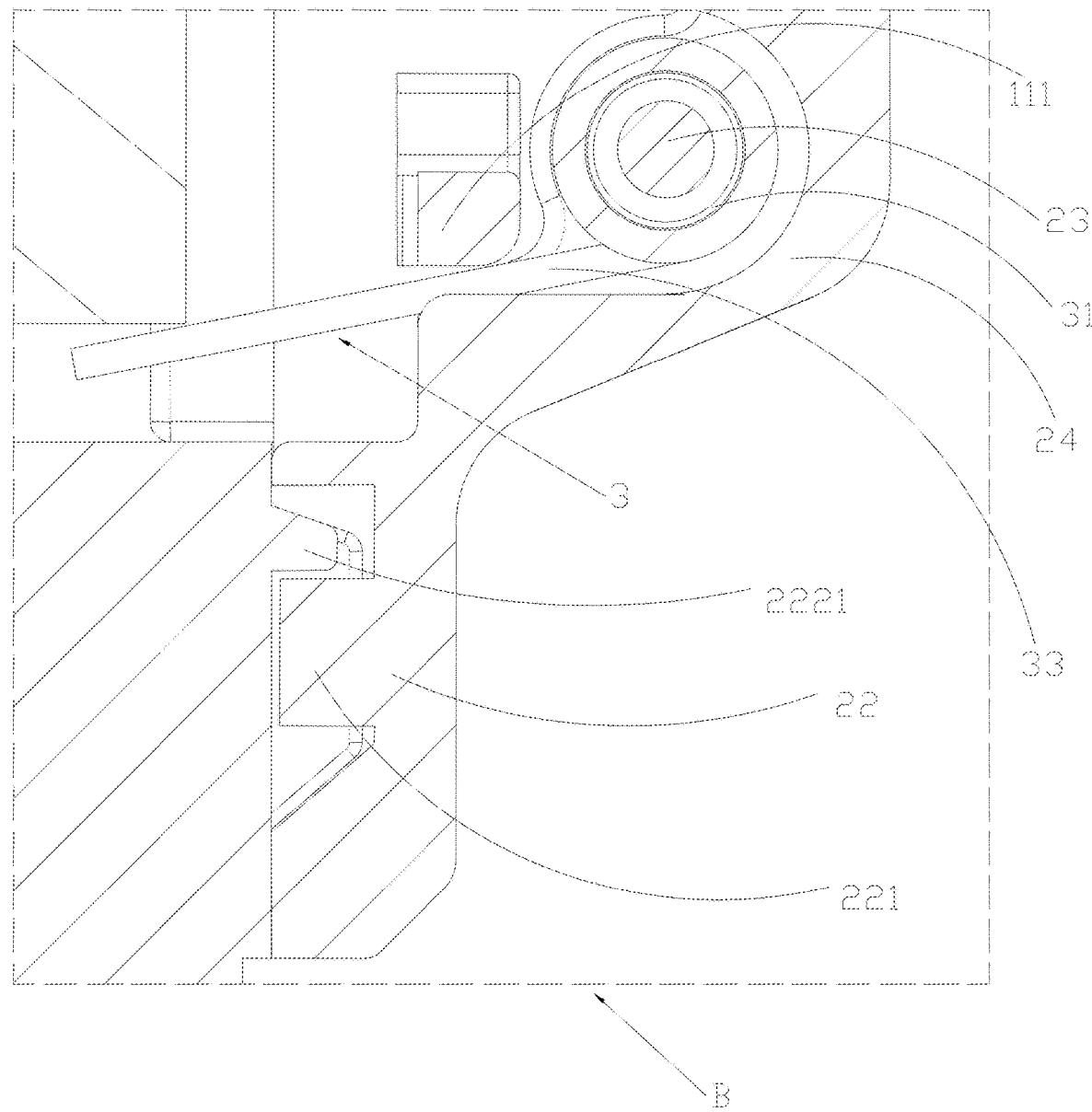
FIG. 5 is an enlarged view of the part B in FIG. 3.
Figure 6:
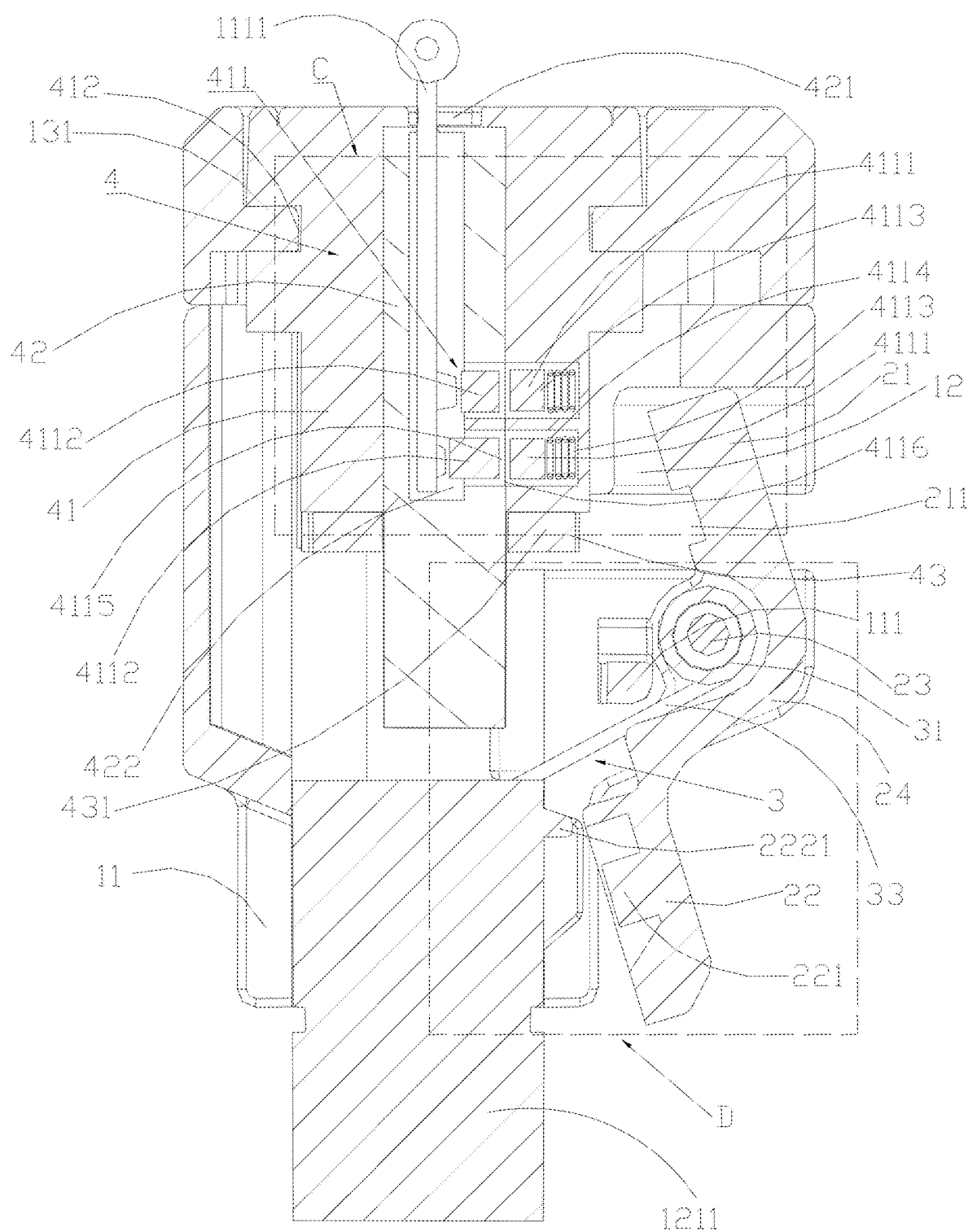
FIG. 6 is a sectional view cut away along a lock cylinder, showing: When a key is inserted to push the second locking pin, the first joint is aligned with the second joint, and the first locking member is in the unlocked state; two ends of the first locking pin are located in the first locking hole, and two ends of the second locking pin are located in the second locking hole; the lock cylinder can rotate in the mounting housing; the baffle plate can rotate with the lock cylinder; the baffle plate rotates to the second position and relieves the blockage on the locking arm; the first end can rotate into the avoidance slot in the direction close to the side wall of the first opening, and the second end can rotate to the unlocked position in the direction facing away from the first opening; the second end is separated from the data interface, thus relieving the clamping of the second end of the locking arm on the data interface.
Figure 7:
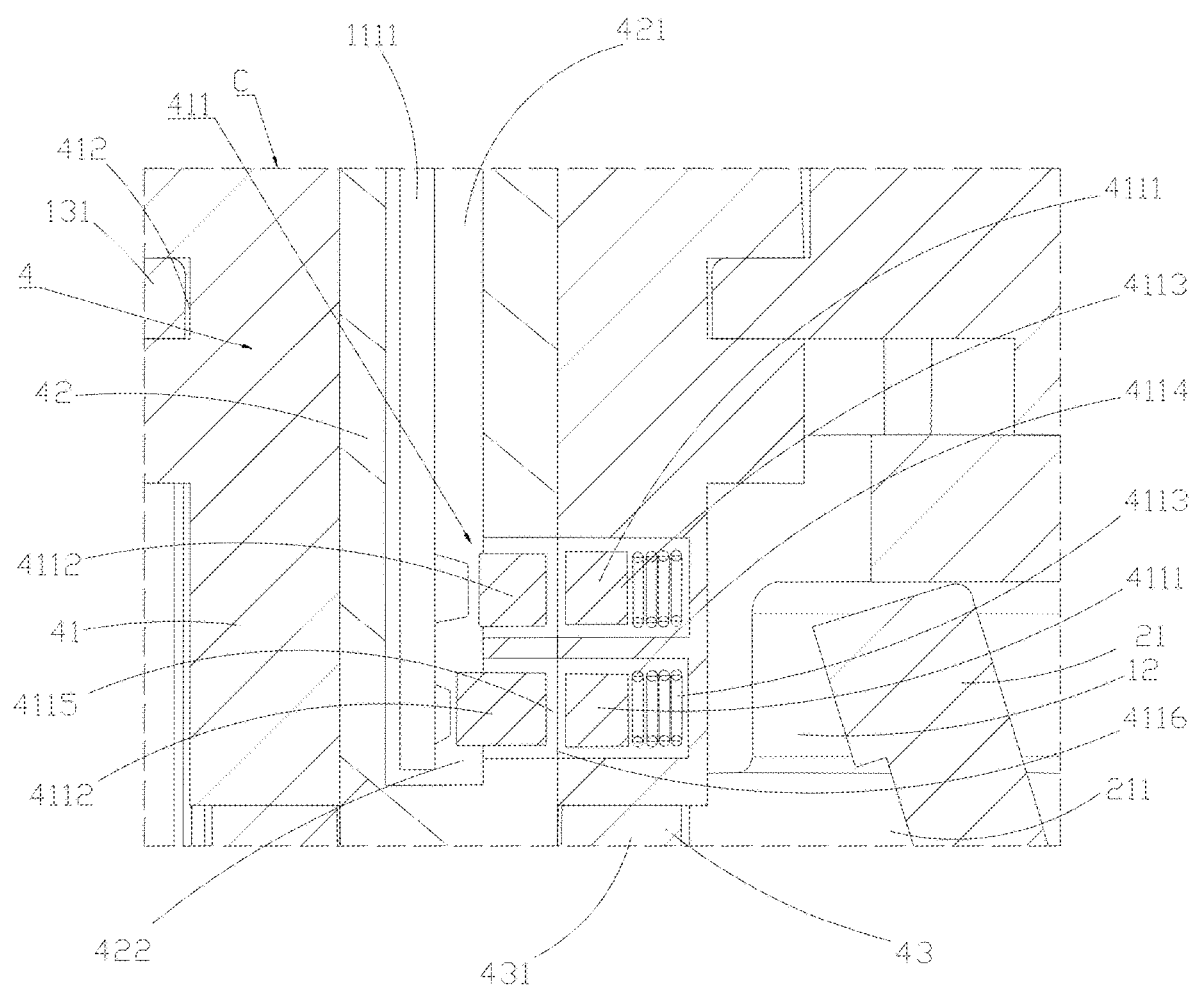
FIG. 7 is an enlarged view of the part C in FIG. 6.
Figure 8:
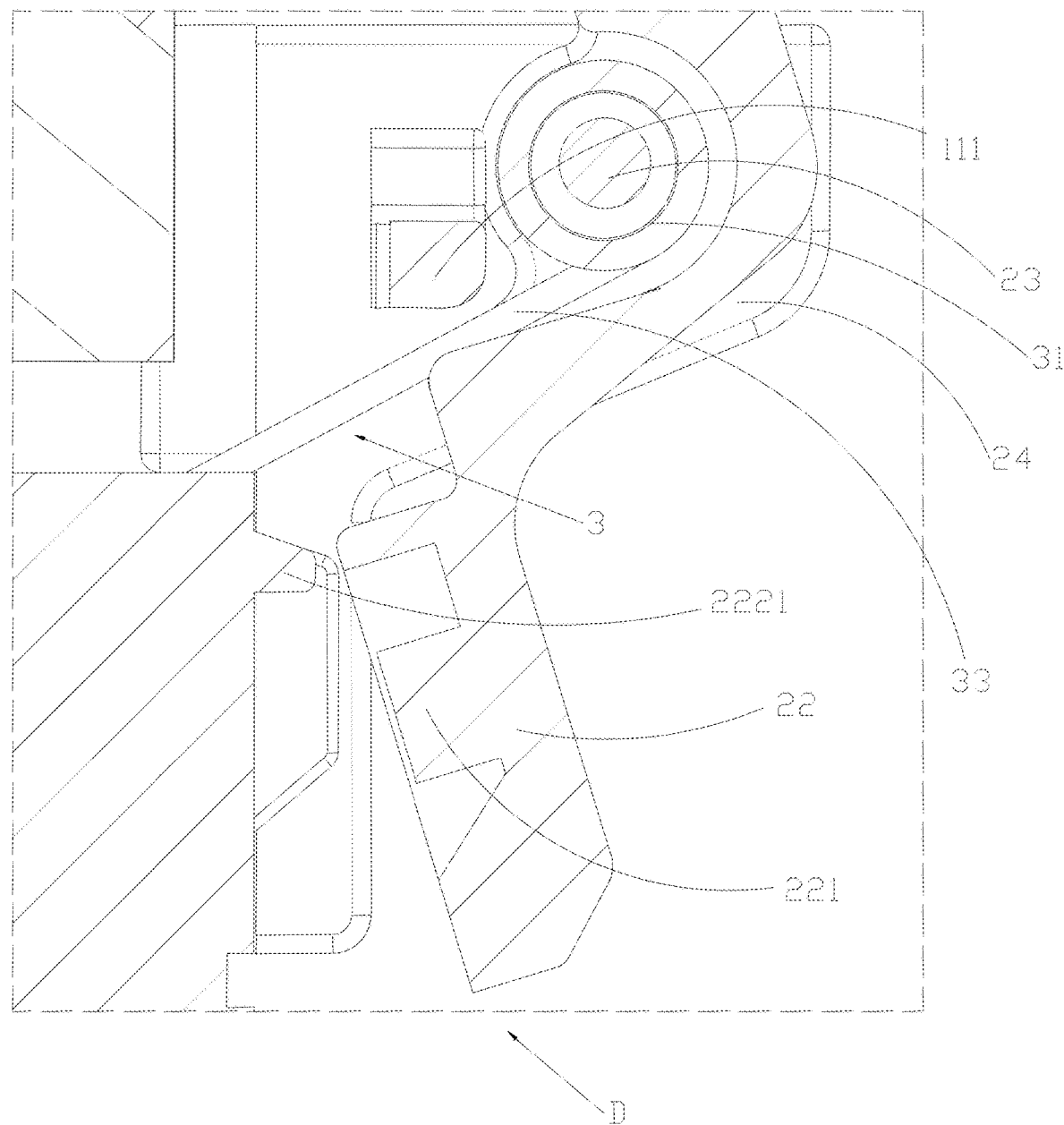
FIG. 8 is an enlarged view of the part D in FIG. 6.

Referring to FIG. 1 to FIG. 8, a lock for a data interface includes:
a lock case main body 1, wherein the lock case main body 1 is provided with a first opening 11, and the first opening 11 is configured to sleeve a data interface 12;
a locking arm 2, wherein the locking arm 2 is rotatably connected to the lock case main body 1; the locking arm 2 can be moved between a locked position and an unlocked position by rotation;
an elastic reset device 3, wherein the elastic reset device 3 is connected to the locking arm 2 to push and reset the locking arm 2 to the locked position, so that the locking arm 2 clamps the data interface together with a side wall of the first opening 11;
a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position.

Through the above structure, the lock includes: a lock case main body 1, wherein the lock case main body 1 is provided with a first opening 11, and the first opening 11 is configured to sleeve a data interface; a locking arm 2, wherein the locking arm 2 is rotatably connected to the lock case main body 1; the locking arm 2 can be moved between a locked position and an unlocked position by rotation; an elastic reset device 3, wherein the elastic reset device 3 is connected to the locking arm 2 to push and reset the locking arm 2 to the locked position, so that the locking arm 2 clamps the data interface together with a side wall of the first opening 11; a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position. A user can use the locking device 4 to lock the locking arm 2, and lock the locking arm 2 in the locked position, so that the locking arm 2 and the side wall of the first opening 11 clamp the data interface, and the lock case main body 1 closes the data interface, thereby preventing criminals from stealing data through the data interface. When a user needs to read data, the user can relieve the locking of the locking device 4 on the locking arm 2, so that the locking device 4 is in the unlocked state, and the locking arm 2 can be rotated to the unlocked position. Thus, the locking arm 2 can be separated from the data interface by rotation, so as to relieve the clamping of the locking arm 2 and the side wall of the first opening 11 on the data interface, which removes the lock case main body 1 from the data interface, and the user can read the data using the data interface.

In this embodiment, the lock case main body 1 is further provided with a second opening 13; the locking device 4 includes a mounting housing 41, a lock cylinder 42, and a baffle plate 43; the mounting housing 41 is mounted at the second opening 13; the lock cylinder 42 is arranged in the mounting housing 41, and the lock cylinder 42 can rotate in the mounting housing 41; the baffle plate 43 sleeves the lock cylinder (42); the baffle plate 43 can rotate with the lock cylinder 42, so that the baffle plate 43 can move between a first position and a second position by rotation; when the baffle plate 43 moves to the first position, the baffle plate 43 blocks and locks the locking arm 2 in the locked position; and when the baffle plate 43 moves to the second position, the baffle plate 43 relieves the blockage on the locking arm 2, so that the locking arm 2 can be rotated to the unlocked position to relieve the clamping of the locking arm 2 on the data interface. Several first locking members 411 are arranged in the mounting housing 41; the first locking members 411 are configured to lock the lock cylinder 42 to the mounting housing 41; when the first locking members 411 are in an unlocked state, the lock cylinder 42 can rotate in the mounting housing 41; the baffle plate 43 can rotate with the lock cylinder 42, so that the baffle plate 43 can move between the first position and the second position by rotation; and when the first locking members 411 are in a locked state, the lock cylinder 42 cannot rotate in the mounting housing 41, so as to fix the baffle plate 43 in the second position, so that the baffle plate 43 blocks and locks the locking arm 2 in the locked position. Through the above structure, the first locking members 411 can be switched to the unlocked state only if a correct key 1111 is inserted into the lock cylinder 42; the lock cylinder 42 can rotate in the mounting housing 41; the baffle plate 43 can rotate with the lock cylinder 42; the baffle plate 43 can move to the second position by rotation, and the baffle plate 43 relieves the blockage on the locking arm 2; the locking arm 2 can be rotated to the unlocked position, so that the locking arm 2 can be separated from the data interface by rotation to: relieve the clamping of the locking arm 2 and the side wall of the first opening 11 on the data interface and remove the lock case main body 1 from the data interface, and a user can read data by using the data interface; and meanwhile, due to the arrangement of the lock cylinder 42, a wrong key cannot switch the first locking members 411 to the unlocked state, so that this can prevent a criminal from unlocking the data interface to steal data.

In this embodiment, the lock cylinder 42 is provided with a key hole 421; each first locking member 411 includes a first locking pin 4111, a second locking pin 4112, and a first spring 4113; a first locking hole 4114 is provided in the mounting housing 41; a second locking hole 422 is provided in the lock cylinder 42; the first spring 4113 is arranged in the first locking hole 4114; one end of the first locking pin 4111 is connected to the first spring 4113; the second locking pin 4112 is inserted into the second locking hole 422; the other end of the first locking pin 4111 is abutted with the second locking pin 4112; a first joint 4115 is formed between the first locking pin 4111 and the second locking pin 4112; a second joint 4116 is formed at a connection between the lock cylinder 42 and the mounting housing 41; when the first joint 4115 is aligned with the second joint 4116, the first locking member 411 is in the unlocked state; two ends of the first locking pin 4111 are located in the first locking hole 4114; two ends of the second locking pin 4112 are located in the second locking hole 422; the lock cylinder 42 can rotate in the mounting housing 41, and the baffle plate 43 can rotate with the lock cylinder 42, so that the baffle plate 43 can rotate between the first position and the second position; when the first joint 4115 is misaligned with the second joint 4116, the first locking member 411 is in the locked state; one end of the first locking pin 4111 is inserted into the second locking hole 422, and the other end of the first locking pin 4111 is inserted into the first locking hole 4114, so that the lock cylinder 42 cannot rotate in the mounting housing 41; or, when the first joint 4115 is misaligned with the second joint 4116, the first locking member 411 is in the locked state; and one end of the second locking pin 4112 is inserted into the second locking hole 422, and the other end of the second locking pin 4112 is inserted into the first locking hole 4114, so that the lock cylinder 42 cannot rotate in the mounting housing 41. Through the above structure, only if a correct key is inserted into the lock cylinder 42, the first locking pin 4111 and the second locking pin 4112 can be pushed to correct positions to align the first joint 4115 with the second joint 4116, and the first locking member 411 can be switched to the unlocked state; the lock cylinder 42 can rotate in the mounting housing 41; the baffle plate 43 can rotate with the lock cylinder 42; the baffle plate 43 can move to the second position by rotation, and the baffle plate 43 relieves the blockage on the locking arm 2; the locking arm 2 can be rotated to the unlocked position, so that the locking arm 2 can be separated from the data interface by rotation to: relieve the clamping of the locking arm 2 and the side wall of the first opening 11 on the data interface and remove the lock case main body 1 from the data interface, and a user can read data by using the data interface; and meanwhile, due to the arrangement of the lock cylinder 42, a wrong key cannot align the first joint 4115 with the second joint 4116 and cannot switch the first locking member 411 to the unlocked state, so that this can prevent a criminal from unlocking the data interface to steal data.

In this embodiment, lengths of the first locking pins 4111 of the several first locking members 411 are the same, and lengths of the second locking pins 4112 of the several first locking members 411 are different from one another. Through the above structure, due to the different lengths of the second locking pins 4112 of the several first locking members 411, this combination makes the structure of the lock cylinder 42 more complex, which further improves the security of the lock cylinder 42. Only the correct key can simultaneously open the several first locking members 411 to prevent criminals from unlocking the data interface and stealing data.

In this embodiment, the locking arm 2 is provided with a first end 21, a second end 22, a rotating shaft 23, and a connecting end 24 located between the first end 21 and the second end 22, and the connecting end 24 is rotatably connected to the lock case main body 1 through the rotating shaft 23. When the baffle plate 43 moves to the first position, the baffle plate 43 pushes and blocks the first end 21 in a direction facing away from the side wall of the first opening 11 to push and block the second end 22 in a direction close to the side wall of the first opening 11; the second end 22 of the locking arm 2 is blocked and locked in the locked position; the second end 22 of the locking arm 2 clamps the data interface together with the side wall of the first opening 11; when the baffle plate 43 moves to the second position, the baffle plate 43 relieves the blockage on the locking arm 2, so that the first end 21 can rotate in the direction close to the side wall of the first opening 11; and the second end 22 can rotate to the unlocked position in the direction facing away from the side wall of the first opening 11, so that the second end 22 is separated from the data interface to relieve the clamping of the second end 22 of the locking arm 2 on the data interface. Specifically, the lock case main body 1 is further provided with an avoidance slot 1211; when the baffle plate 43) moves to the first position, the baffle plate 43 is located in the avoidance slot 1211; the baffle plate 43 pushes and blocks the first end 21 in the direction facing away from the side wall of the first opening 11 to push the second end 22 in the direction close to the side wall of the first opening 11; the first end 21 cannot rotate into the avoidance slot 1211; when the baffle plate 43 moves to the second position, the baffle plate 43 moves out of the avoidance slot 1211; the baffle plate 43 relieves the blockage on the locking arm 2, so that the first end 21 can rotate into the avoidance slot 1211 in the direction close to the side wall of the first opening 11; and the second end 22 can rotate to the unlocked position in the direction facing away from the side wall of the first opening 11, so that the second end 22 is separated from the data interface and relieves the clamping of the second end 22 of the locking arm 2 on the data interface. Further, the clastic reset device 3 is connected to the rotating shaft 23. Still further, the clastic reset device 3 is a torsion spring; the torsion spring is provided with a first sleeving opening 31; the torsion spring sleeves the rotating shaft 23 through the first sleeving opening 31; the first opening 11 is further provided with a limiting column 111 on the side wall; the torsion spring is provided with a first clastic arm 32 and a second clastic arm 33; the second clastic arm 33 is located between the second end 22 and the limiting column 111; the first clastic arm 32 pushes the first end 21 in the direction facing away from the side wall of the first opening 11) to push the second end 22 in the direction close to the side wall of the first opening 11; and the second end 22 clamps the data interface together with the side wall of the first opening 11. Still further, the second end 22 of the locking arm 2 is provided with a first hook portion 221; and when the locking arm 2 is rotated to the locked position, the first hook portion 221 is connected to a first hook fitting portion 2221 of the data interface. Through the above structure, when the locking arm 2 is rotated to the locked position, the first hook portion 221 is connected to the first hook fitting portion 2221 of the data interface, which can better clamp the data interface by the second end 22 and the side wall of the first opening 11, and prevent the lock case main body 1 from being separated from the data interface. Furthermore, when the baffle plate 43 moves to the second position, the baffle plate 43 moves out of the avoidance slot 1211; the baffle plate 43 relieves the blockage on the locking arm 2, so that a user can press the first end 21 to cause the first end 21 to rotate into the avoidance slot 1211 in the direction close to the side wall of the first opening 11; and the second end 22 can rotate to the unlocked position in the direction facing away from the side wall of the first opening 11, so that the second end 22 is separated from the data interface and relieves the clamping of the second end 22 of the locking arm 2 on the data interface to remove the lock case main body 1 from the data interface. This facilitates the user to read data. Common OBD data interfaces on the market all have the first hook fitting portion. By connecting the first hook portion to the first hook fitting portion, the locking arm and the side wall of the first opening can better clamp the data interface.

In this embodiment, a second positioning groove 211 is provided at the first end 21 of the locking arm 2; when the baffle plate 43 moves to the first position, the baffle plate 43 resists against an inner wall of the second positioning groove 211; the baffle plate 43 pushes and blocks the first end 21 in a direction facing away from the side wall of the first opening 11 to push and block the second end 22 in a direction close to the side wall of the first opening 11; the second end 22 of the locking arm 2 is blocked and locked in the locked position; and the second end 22 of the locking arm 2 clamps the data interface together with the side wall of the first opening 11. Through the above structure, the baffle plate 43 can rotate in the second positioning groove 211, so that the baffle plate 43 can move between the first position and the second position by rotation.

In this embodiment, the data interface is an OBD data interface. Through the above structure, the OBD data interface is standard for every gasoline vehicle and has the same size. Regardless of a vehicle model, the OBD data interface is only provided at different points. It may be at all directions of the vehicle. Relevant data of a vehicle can be read through the OBD data interface of the vehicle. To prevent criminals from stealing a vehicle or modifying data, such as mileage, of a vehicle, through the OBD data interface using a device fitting key, a lock for a data interface needs to be arranged at the OBD data interface to achieve an anti-theft effect.

In this embodiment, a second sleeving opening 431 is provided on the baffle plate 43, and the baffle plate 43 sleeves the lock cylinder 42 through the second sleeving opening 431. The second opening 13 is provided with a first positioning protrusion 131 on an inner wall; a first positioning groove 412 is provided on an outer side wall of the mounting housing 41; the first positioning groove 412 is connected to the first positioning protrusion 131; or, the second opening 13 is provided with a first positioning groove 412 on an inner wall; a first positioning protrusion 131 is arranged on an outer side wall of the mounting housing 41; and the first positioning groove 412 is connected to the first positioning protrusion 131. Specifically, the mounting housing 41 includes a first mounting portion 413 and a second mounting portion 414; the first mounting portion 413 is provided with a first flange 4131; the second mounting portion 414 is provided with a second flange 4132; the second mounting portion 414 detachably sleeves the first mounting portion 413 to form the first positioning groove 412 between the first flange 4131 and the second flange 4132; and the second flange 4132 compresses the first positioning protrusion 131 onto the first flange 4131. Further, the second mounting portion 414 is in threaded connection to the first mounting portion 413. Still further, the lock case main body 1 includes an upper case 14 and a lower case 15; and the upper case 14 is detachably connected to the lower case 15. Still further, the upper case 14 is connected to the lower case 15 through a buckle 1511. Through the above structure, the design is reasonable, and the structure is simple; and mounting of the lock cylinder 42 and the baffle plate 43 is effectively achieved.

A lock for an OBD data interface includes:
- a lock case main body 1, wherein the lock case main body 1 is provided with a first opening 11, and the first opening 11 is configured to sleeve a data interface;
- a locking arm 2, wherein the locking arm 2 is rotatably connected to the lock case main body 1; the locking arm 2 can be moved between a locked position and an unlocked position by rotation;
- an elastic reset device 3, wherein the clastic reset device 3 is connected to the locking arm 2 to push and reset the locking arm 2 to the locked position, so that the locking arm 2 clamps the data interface together with a side wall of the first opening 11;
- a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position.

Through the above structure, the lock includes: a lock case main body 1, wherein the lock case main body 1 is provided with a first opening 11, and the first opening 11 is configured to sleeve a data interface; a locking arm 2, wherein the locking arm 2 is rotatably connected to the lock case main body 1; the locking arm 2 can be moved between a locked position and an unlocked position by rotation; an elastic reset device 3, wherein the elastic reset device 3 is connected to the locking arm 2 to push and reset the locking arm 2 to the locked position, so that the locking arm 2 clamps the data interface together with a side wall of the first opening 11; a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position. Therefore, a user can use the locking device 4 to lock the locking arm 2, and lock the locking arm 2 in the locked position, so that the locking arm 2 and the side wall of the first opening 11 clamp the data interface, and the lock case main body 1 closes the data interface, thereby preventing criminals from stealing data through the data interface. When a user needs to read data, the user can relieve the locking of the locking device 4 on the locking arm 2, so that the locking device 4 is in the unlocked state, and the locking arm 2 can be rotated to the unlocked position. Thus, the locking arm 2 can be separated from the data interface by rotation, so as to relieve the clamping of the locking arm 2 and the side wall of the first opening 11 on the data interface, which removes the lock case main body 1 from the data interface, and the user can read the data using the data interface. Furthermore, the OBD data interface is standard for every gasoline vehicle and has the same size. Regardless of a vehicle model, the OBD data interface is only provided at different points. It may be at all directions of the vehicle. Relevant data of a vehicle can be read through the OBD data interface of the vehicle. To prevent criminals from stealing a vehicle or modifying data, such as mileage, of a vehicle, through the OBD data interface using a device fitting key, a lock for a data interface needs to be arranged at the OBD data interface to achieve an anti-theft effect.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A lock for a data interface, comprising:
a lock case main body (1), wherein the lock case main body (1) is provided with a first opening (11), and the first opening (11) is configured to sleeve a data interface (12);
a locking arm (2), wherein the locking arm (2) is rotatably connected to the lock case main body (1); the locking arm (2) is able to be moved between a locked position and an unlocked position by rotation;
an elastic reset device (3), wherein the elastic reset device (3) is connected to the locking arm (2) to push and reset the locking arm (2) to the locked position, so that the locking arm (2) clamps the data interface together with a side wall of the first opening (11);
a locking device (4), wherein the locking device (4) is connected to the lock case main body (1);
the locking device (4) is configured to lock the locking arm (2); when the locking device (4) is in an unlocked state, the locking arm (2) is able to be moved between the locked position and the unlocked position by rotation; and when the locking device (4) is in a locked state, the locking arm (2) is unable to be rotated, and the locking device (4) locks the locking arm (2) in the locked position.

2. The lock for the data interface according to claim 1, wherein the lock case main body (1) is further provided with a second opening (13); the locking device (4) comprises a mounting housing (41), a lock cylinder (42), and a baffle plate (43); the mounting housing (41) is mounted at the second opening (13); the lock cylinder (42) is arranged in the mounting housing (41), and the lock cylinder (42) is able to rotate in the mounting housing (41); the baffle plate (43) sleeves the lock cylinder (42); the baffle plate (43) is able to rotate with the lock cylinder (42), so that the baffle plate (43) is able to move between a first position and a second position by rotation; when the baffle plate (43) moves to the first position, the baffle plate (43) blocks and locks the locking arm (2) in the locked position; and when the baffle plate (43) moves to the second position, the baffle plate (43) relieves the blockage on the locking arm (2), so that the locking arm (2) is able to be rotated to the unlocked position to relieve the clamping of the locking arm (2) on the data interface.

3. The lock for the data interface according to claim 2, wherein several first locking members (411) are arranged in the mounting housing (41); the first locking members (411) are configured to lock the lock cylinder (42) to the mounting housing (41); when the first locking members (411) are in an unlocked state, the lock cylinder (42) is able to rotate in the mounting housing (41); the baffle plate (43) is able to rotate with the lock cylinder (42), so that the baffle plate (43) is able to move between the first position and the second position by rotation; and when the first locking members (411) are in a locked state, the lock cylinder (42) is unable to rotate in the mounting housing (41), so as to fix the baffle plate (43) in the second position, so that the baffle plate (43) blocks and locks the locking arm (2) in the locked position.

4. The lock for the data interface according to claim 3, wherein the lock cylinder (42) is provided with a key hole (421); each first locking member (411) comprises a first locking pin (4111), a second locking pin (4112), and a first spring (4113); a first locking hole (4114) is provided in the mounting housing (41); a second locking hole (422) is provided in the lock cylinder (42); the first spring (4113) is arranged in the first locking hole (4114); one end of the first locking pin (4111) is connected to the first spring (4113); the second locking pin (4112) is inserted into the second locking hole (422); the other end of the first locking pin (4111) is abutted with the second locking pin (4112); a first joint (4115) is formed between the first locking pin (4111) and the second locking pin (4112); a second joint (4116) is formed at a connection between the lock cylinder (42) and the mounting housing (41); when the first joint (4115) is aligned with the second joint (4116), the first locking member (411) is in the unlocked state; two ends of the first locking pin (4111) are located in the first locking hole (4114); two ends of the second locking pin (4112) are located in the second locking hole (422); the lock cylinder (42) is able to rotate in the mounting housing (41), and the baffle plate (43) is able to rotate with the lock cylinder (42), so that the baffle plate (43) is able to rotate between the first position and the second position; when the first joint (4115) is misaligned with the second joint (4116), the first locking member (411) is in the locked state; one end of the first locking pin (4111) is inserted into the second locking hole (422), and the other end of the first locking pin (4111) is inserted into the first locking hole (4114), so that the lock cylinder (42) is unable to rotate in the mounting housing (41); or, when the first joint (4115) is misaligned with the second joint (4116), the first locking member (411) is in the locked state; and one end of the second locking pin (4112) is inserted into the second locking hole (422), and the other end of the second locking pin (4112) is inserted into the first locking hole (4114), so that the lock cylinder (42) is unable to rotate in the mounting housing (41).

5. The lock for the data interface according to claim 4, wherein lengths of the first locking pins (4111) of the several first locking members (411) are the same, and lengths of the second locking pins (4112) of the several first locking members (411) are different from one another.

6. The lock for the data interface according to claim 2, wherein the locking arm (2) is provided with a first end (21), a second end (22), a rotating shaft (23), and a connecting end (24) located between the first end (21) and the second end (22), and the connecting end (24) is rotatably connected to the lock case main body (1) through the rotating shaft (23).

7. The lock for the data interface according to claim 6, wherein when the baffle plate (43) moves to the first position, the baffle plate (43) pushes and blocks the first end (21) in a direction facing away from the side wall of the first opening (11) to push and block the second end (22) in a direction close to the side wall of the first opening (11); the second end (22) of the locking arm (2) is blocked and locked in the locked position; the second end (22) of the locking arm (2) clamps the data interface together with the side wall of the first opening (11); when the baffle plate (43) moves to the second position, the baffle plate (43) relieves the blockage on the locking arm (2), so that the first end (21) is able to rotate in the direction close to the side wall of the first opening (11); and the second end (22) is able to rotate to the unlocked position in the direction facing away from the side wall of the first opening (11), so that the second end (22) is separated from the data interface to relieve the clamping of the second end (22) of the locking arm (2) on the data interface.

8. The lock for the data interface according to claim 7, wherein the lock case main body (1) is further provided with an avoidance slot (1211); when the baffle plate (43) moves to the first position, the baffle plate (43) is located in the avoidance slot (1211); the baffle plate (43) pushes and blocks the first end (21) in the direction facing away from the side wall of the first opening (11) to push the second end (22) in the direction close to the side wall of the first opening (11); the first end (21) is unable to rotate into the avoidance slot (1211); when the baffle plate (43) moves to the second position, the baffle plate (43) moves out of the avoidance slot (1211); the baffle plate (43) relieves the blockage on the locking arm (2), so that the first end (21) is able to rotate into the avoidance slot (1211) in the direction close to the side wall of the first opening (11); and the second end (22) is able to rotate to the unlocked position in the direction facing away from the side wall of the first opening (11), so that the second end (22) is separated from the data interface and relieves the clamping of the second end (22) of the locking arm (2) on the data interface.

9. The lock for the data interface according to claim 6, wherein the elastic reset device (3) is connected to the rotating shaft (23).

10. The lock for the data interface according to claim 9, wherein the elastic reset device (3) is a torsion spring; the torsion spring is provided with a first sleeving opening (31); the torsion spring sleeves the rotating shaft (23) through the first sleeving opening (31); the first opening (11) is further provided with a limiting column (111) on the side wall; the torsion spring is provided with a first elastic arm (32) and a second elastic arm (33); the second elastic arm (33) is located between the second end (22) and the limiting column (111); the first elastic arm (32) pushes the first end (21) in the direction facing away from the side wall of the first opening (11) to push the second end (22) in the direction close to the side wall of the first opening (11); and the second end (22) clamps the data interface together with the side wall of the first opening (11).

11. The lock for the data interface according to claim 6, wherein the second end (22) of the locking arm (2) is provided with a first hook portion (221); and when the locking arm (2) is rotated to the locked position, the first hook portion (221) is connected to a first hook fitting portion (2221) of the data interface.

12. The lock for the data interface according to claim 6, wherein a second positioning groove (211) is provided at the first end (21) of the locking arm (2); when the baffle plate (43) moves to the first position, the baffle plate (43) resists against an inner wall of the second positioning groove (211); the baffle plate (43) pushes and blocks the first end (21) in a direction facing away from the side wall of the first opening (11) to push and block the second end (22) in a direction close to the side wall of the first opening (11); the second end (22) of the locking arm (2) is blocked and locked in the locked position; and the second end (22) of the locking arm (2) clamps the data interface together with the side wall of the first opening (11).

13. The lock for the data interface according to claim 1, wherein the data interface is an On-Board Diagnostic (OBD) data interface.

14. The lock for the data interface according to claim 2, wherein a second sleeving opening (431) is provided on the baffle plate (43), and the baffle plate (43) sleeves the lock cylinder (42) through the second sleeving opening (431).

15. The lock for the data interface according to claim 2, wherein the second opening (13) is provided with a first positioning protrusion (131) on an inner wall; a first positioning groove (412) is provided on an outer side wall of the mounting housing (41); the first positioning groove (412) is connected to the first positioning protrusion (131); or, the second opening (13) is provided with a first positioning groove (412) on an inner wall; a first positioning protrusion (131) is arranged on an outer side wall of the mounting housing (41); and the first positioning groove (412) is connected to the first positioning protrusion (131).

16. The lock for the data interface according to claim 15, wherein the mounting housing (41) comprises a first mounting portion (413) and a second mounting portion (414); the first mounting portion (413) is provided with a first flange (4131); the second mounting portion (414) is provided with a second flange (4132); the second mounting portion (414) detachably sleeves the first mounting portion (413) to form the first positioning groove (412) between the first flange (4131) and the second flange (4132); and the second flange (4132) compresses the first positioning protrusion (131) onto the first flange (4131).

17. The lock for the data interface according to claim 16, wherein the second mounting portion (414) is in threaded connection to the first mounting portion (413).

18. The lock for the data interface according to claim 1, wherein the lock case main body (1) comprises an upper case (14) and a lower case (15); and the upper case (14) is detachably connected to the lower case (15).

19. The lock for the data interface according to claim 18, wherein the upper case (14) is connected to the lower case (15) through a buckle (1511).

20. A lock for an OBD data interface, comprising
- a lock case main body (1), wherein the lock case main body (1) is provided with a first opening (11), and the first opening (11) is configured to sleeving a data interface;
- a locking arm (2), wherein the locking arm (2) is rotatably connected to the lock case main body (1); the locking arm (2) is able to be moved between a locked position and an unlocked position by rotation;
- an elastic reset device (3), wherein the elastic reset device (3) is connected to the locking arm (2) to push and reset the locking arm (2) to the locked position, so that the locking arm (2) clamps the data interface together with a side wall of the first opening (11);
  - a locking device (4), wherein the locking device (4) is connected to the lock case main body (1); the locking device (4) is configured to lock the locking arm (2); when the locking device (4) is in an unlocked state, the locking arm (2) is able to be moved between the locked position and the unlocked position by rotation; and when the locking device (4) is in a locked state, the locking arm (2) is unable to be rotated, and the locking device (4) locks the locking arm (2) in the locked position.

\* \* \* \* \*